(12) United States Patent
Lee

(10) Patent No.: US 8,035,741 B2
(45) Date of Patent: Oct. 11, 2011

(54) APPARATUS AND METHOD FOR DETECTING VERTICAL BLANKING INTERVAL SIGNALS

(75) Inventor: Chung Hsiung Lee, Fongshan (TW)

(73) Assignee: MStar Semiconductor, Inc., Hsinchu County (TW)

( * ) Notice: Subject to any disclaimer, the term of this patent is extended or adjusted under 35 U.S.C. 154(b) by 1351 days.

(21) Appl. No.: 11/605,445

(22) Filed: Nov. 29, 2006

(65) Prior Publication Data

US 2008/0074539 A1 Mar. 27, 2008

(30) Foreign Application Priority Data

Sep. 22, 2006 (TW) ................................ 95135048 A

(51) Int. Cl.
*H04N 11/00* (2006.01)
*H04N 7/00* (2011.01)

(52) U.S. Cl. ......... 348/465; 348/467; 348/468; 348/478

(58) Field of Classification Search .................. 348/465, 348/457, 468, 478, 571, 467; 714/798
See application file for complete search history.

(56) References Cited

U.S. PATENT DOCUMENTS

| | | | | |
|---|---|---|---|---|
| 5,249,050 A | | 9/1993 | Zato | |
| 5,371,545 A | * | 12/1994 | Tults | 348/465 |
| 5,666,167 A | * | 9/1997 | Tults | 348/465 |
| 5,838,382 A | * | 11/1998 | Cahill, III | 348/465 |
| 5,844,622 A | * | 12/1998 | Hulvey | 348/546 |
| 5,852,471 A | * | 12/1998 | Furuya et al. | 348/465 |
| 5,926,491 A | * | 7/1999 | Cahill, III | 714/798 |
| 6,005,632 A | * | 12/1999 | Cahill, III | 348/465 |
| 6,377,308 B1 | * | 4/2002 | Cahill, III | 348/461 |
| 6,381,287 B1 | * | 4/2002 | Shin | 375/316 |
| 6,462,782 B1 | * | 10/2002 | Honda et al. | 348/465 |
| 6,741,291 B1 | * | 5/2004 | Tsubaki | 348/533 |
| 6,839,091 B1 | * | 1/2005 | Hebbalalu et al. | 348/465 |
| 7,102,689 B2 | * | 9/2006 | Grossman et al. | 348/465 |
| 7,375,765 B2 | * | 5/2008 | Kudou | 348/465 |
| 7,463,308 B2 | * | 12/2008 | Yamasaki et al. | 348/465 |
| 7,599,003 B2 | * | 10/2009 | Suzuki et al. | 348/465 |
| 7,649,568 B2 | * | 1/2010 | Huang et al. | 348/465 |
| 7,683,090 B2 | * | 3/2010 | Nishida et al. | 514/394 |
| 7,796,193 B2 | * | 9/2010 | Chang et al. | 348/465 |
| 2002/0008776 A1 | * | 1/2002 | Kuzumoto et al. | 348/468 |
| 2002/0129380 A1 | * | 9/2002 | Orii | 725/136 |
| 2003/0048386 A1 | * | 3/2003 | Zeidler | 348/691 |
| 2003/0184677 A1 | * | 10/2003 | Kuzumoto et al. | 348/465 |
| 2004/0095510 A1 | * | 5/2004 | Suzuki et al. | 348/465 |
| 2005/0110903 A1 | * | 5/2005 | Yamasaki et al. | 348/465 |
| 2005/0195326 A1 | * | 9/2005 | Kudou | 348/465 |
| 2007/0008425 A1 | * | 1/2007 | Yang et al. | 348/465 |
| 2007/0008426 A1 | * | 1/2007 | Yang et al. | 348/465 |
| 2007/0064149 A1 | * | 3/2007 | Yang et al. | 348/465 |

* cited by examiner

*Primary Examiner* — Brian Yenke
(74) *Attorney, Agent, or Firm* — IPR Works, LLC

(57) ABSTRACT

An apparatus for detecting vertical blanking interval (VBI) signals and an associated detecting method are disclosed. The apparatus can reduce the probability of false alarm by dynamically adjusting the range of a detection window within the VBI interval, thereby enhancing the detection accuracy. The apparatus includes a detection unit and a window-adjusting unit. The detection unit detects whether a television signal contains a clock run-in signal within the detection window to generate a detection signal. The window-adjusting unit dynamically adjusts the range of the detection window according to the detection signal.

13 Claims, 5 Drawing Sheets

APPARATUS AND METHOD FOR DETECTING VERTICAL BLANKING INTERVAL SIGNALS

BACKGROUND OF INVENTION

1. Field of the Invention

The present invention relates to the vertical blanking interval (VBI) of TV signals, and more particularly to an apparatus and method for detecting VBI signals.

2. Description of the Prior Art

The vertical blanking interval (VBI) includes the scan lines of TV signals reserved for appending various kinds of digital information by TV system providers, so that the audience can obtain various information services such as consuming information, stock market information, program schedule, etc., besides watching standard TV programs. Various VBI specifications have been developed, such as Closed Caption (CC), Copy Generation Management System (CGMS), Wildscreen Signaling (WSS), Video Programming System (VPS), and Teletext. The TV system provider encodes and appends the information to be transmitted to the VBI interval of the TV signal at the transmitting side. Then, after the TV signal is received at the receiving side, the VBI signal is decoded to retrieve the original information.

FIG. 1 is a diagram showing a Teletext VBI signal contained in a scan line. As shown, the VBI signal comprises a horizontal synchronization (Hsync) signal, a color burst signal, a clock run-in signal and data. When a VBI decoder at the receiving side receives a TV signal, it detects whether there is a VBI signal contained in the VBI interval. In the prior art, a window with a fixed width is set in the VBI interval to detect whether the TV signal contains a clock run-in signal. If the TV signal contains the clock run-in signal, then a VBI signal is detected. Since the clock run-in signal may drift and deform due to the signal quality of various system providers and interference during the transmission process, etc., and different VBI signal rules are adopted by various system providers, the conventional VBI decoder applies a wider and fixed window to assure the detection of the clock run-in signal. However, the VBI interval contains various kinds of noises in addition to the VBI signal. The wider the window is, the more possible a false alarm occurs. Thus, it is easier to mistake the detected noise as the clock run-in signal, and the accuracy of the conventional VBI decoder is degraded.

SUMMARY OF INVENTION

It is therefore one objective of the present invention to provide an apparatus and method for detecting VBI signals that can dynamically adjust the range of detection window within the VBI interval, thereby reducing the possibility of false alarm and enhancing the detection accuracy.

An apparatus for detecting a VBI signal is provided. The apparatus comprises: a detection unit for detecting whether a TV signal contains a clock run-in signal within a detection window to generate a detection signal; and a window-adjusting unit, coupled to the detection unit, for dynamically adjusting a range of the detection window according to the detection signal.

A method for detecting a VBI signal is further provided. The method comprises steps of: detecting whether a TV signal contains a clock run-in signal within a detection window to generate a detection signal; and dynamically adjusting a range of the detection window according to the detection signal.

DETAILED DESCRIPTION

Figure 1:
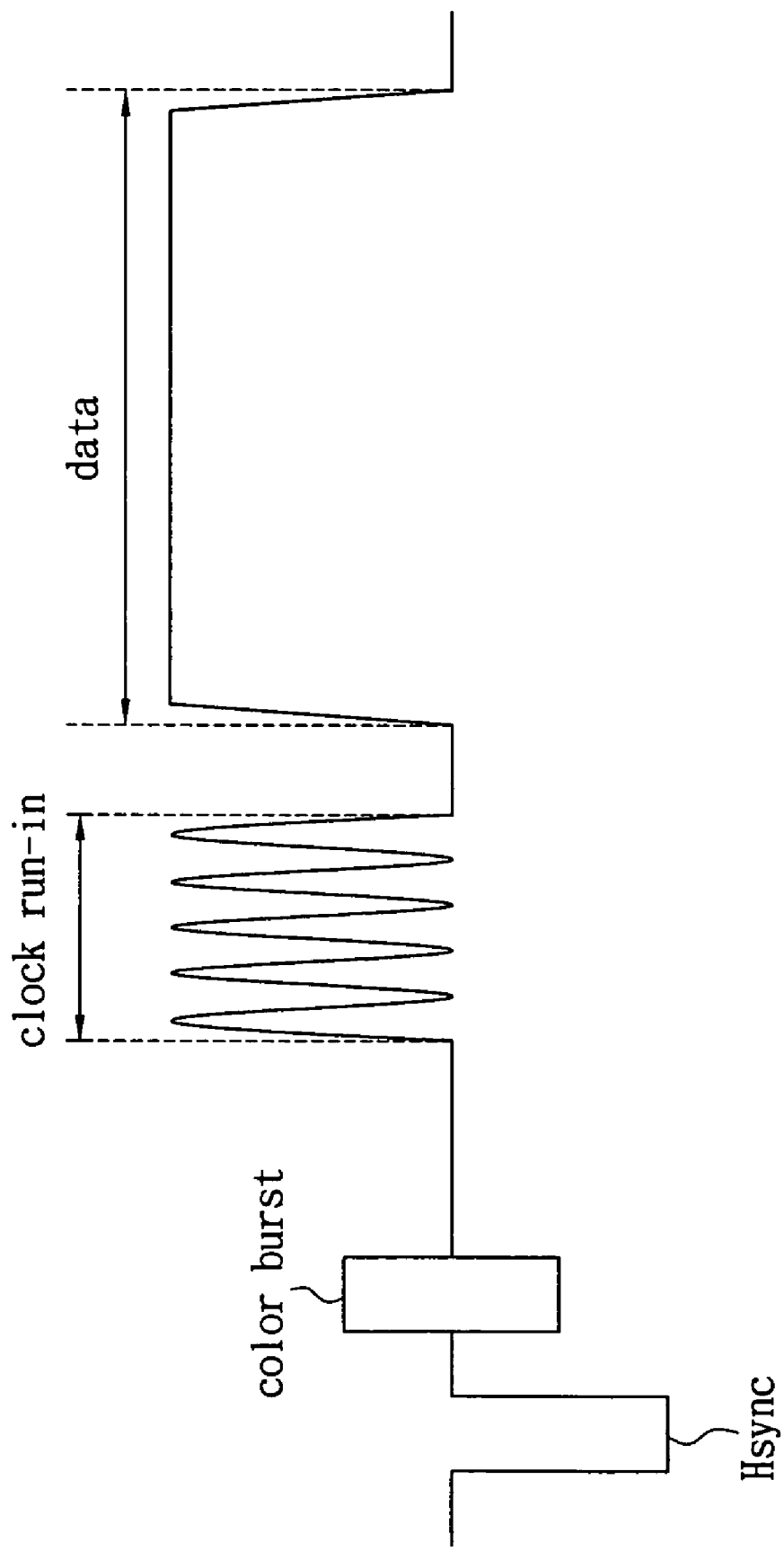
FIG. 1 shows a VBI signal contained in a scan line.
Figure 2:
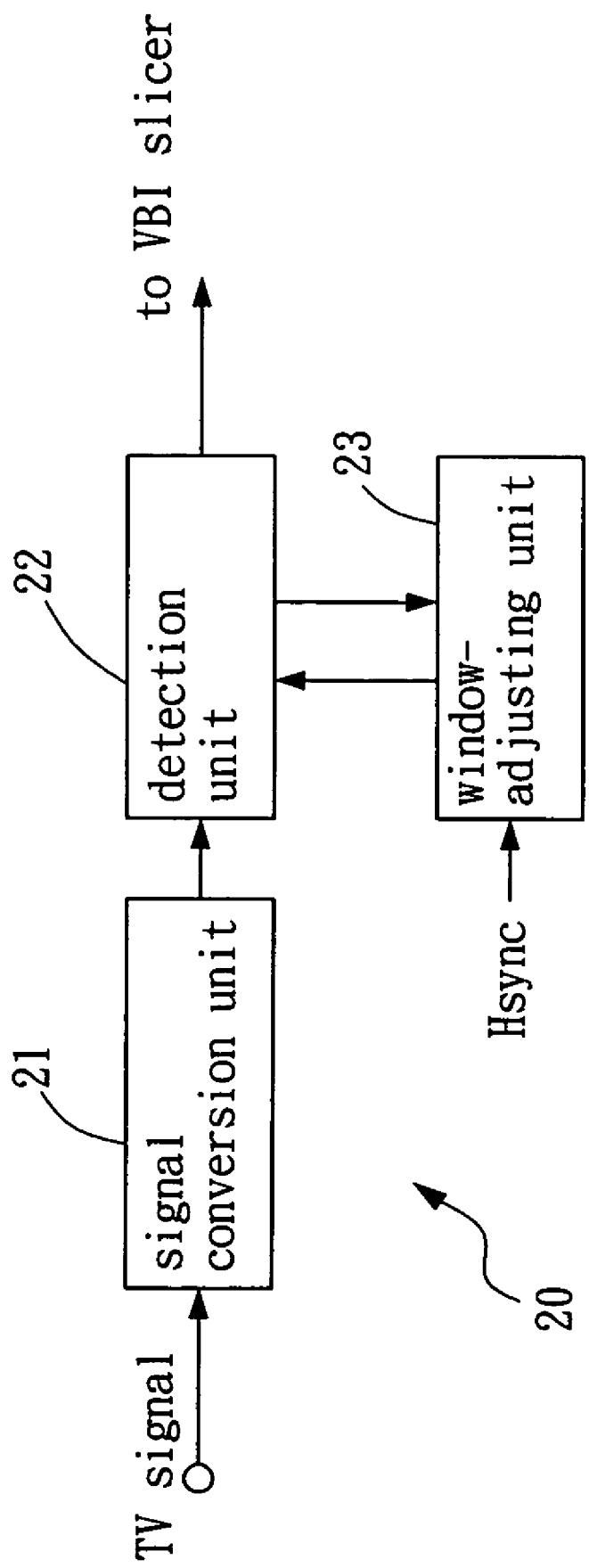
FIG. 2 is a block diagram of an apparatus for detecting VBI signals according to a preferred embodiment of the present invention.

FIG. 2 is a block diagram of an apparatus 20 for detecting VBI signals according to a preferred embodiment of the present invention. The apparatus 20 can detect VBI signals of different specifications such as CC, CGMS, WSS, VPS and Teletext, or any other VBI signals containing a clock run-in signal or an equivalent signal. The apparatus 20 comprises a signal conversion unit 21, a detection unit 22, and a window-adjusting unit 23. The signal conversion unit 21, such as an analog-to-digital converter, samples a TV signal and output the result to the detection unit 22. The TV signal conforms to NTSC (National Television System Committee), PAL (Phase Alternating Line) or SECAM (Sequential Couleur Avec Memoire) standard. Moreover, the TV signal can be a CVBS signal, Y/C signal, or Y/Pb/Pr signal.

After receiving the sampled TV signal, the detection unit 22 opens a detection window, a predetermined range of sample points on a horizontal scan line in the VBI interval, for example, the range of $100^{th}$ to $200^{th}$ sample points, in the VBI interval of the sampled TV signal, and determines whether the detection window contains a clock run-in signal according to the sampled values of the TV signal within the detection window. If it contains the clock run-in signal, then a VBI signal is detected. The detected VBI signal is sent to a VBI slicer for subsequent processing. In addition, the detection unit 22 outputs a detection signal according to the detection result. The detection unit 22 compares the level value of each sample point in the detection window with a threshold, so as to determine the location where the clock run-in signal is present. The threshold is determined according to a reference level, which can be a fixed level or determined according to a plurality of sampled values of the TV signal in a reference window.

Figure 3:
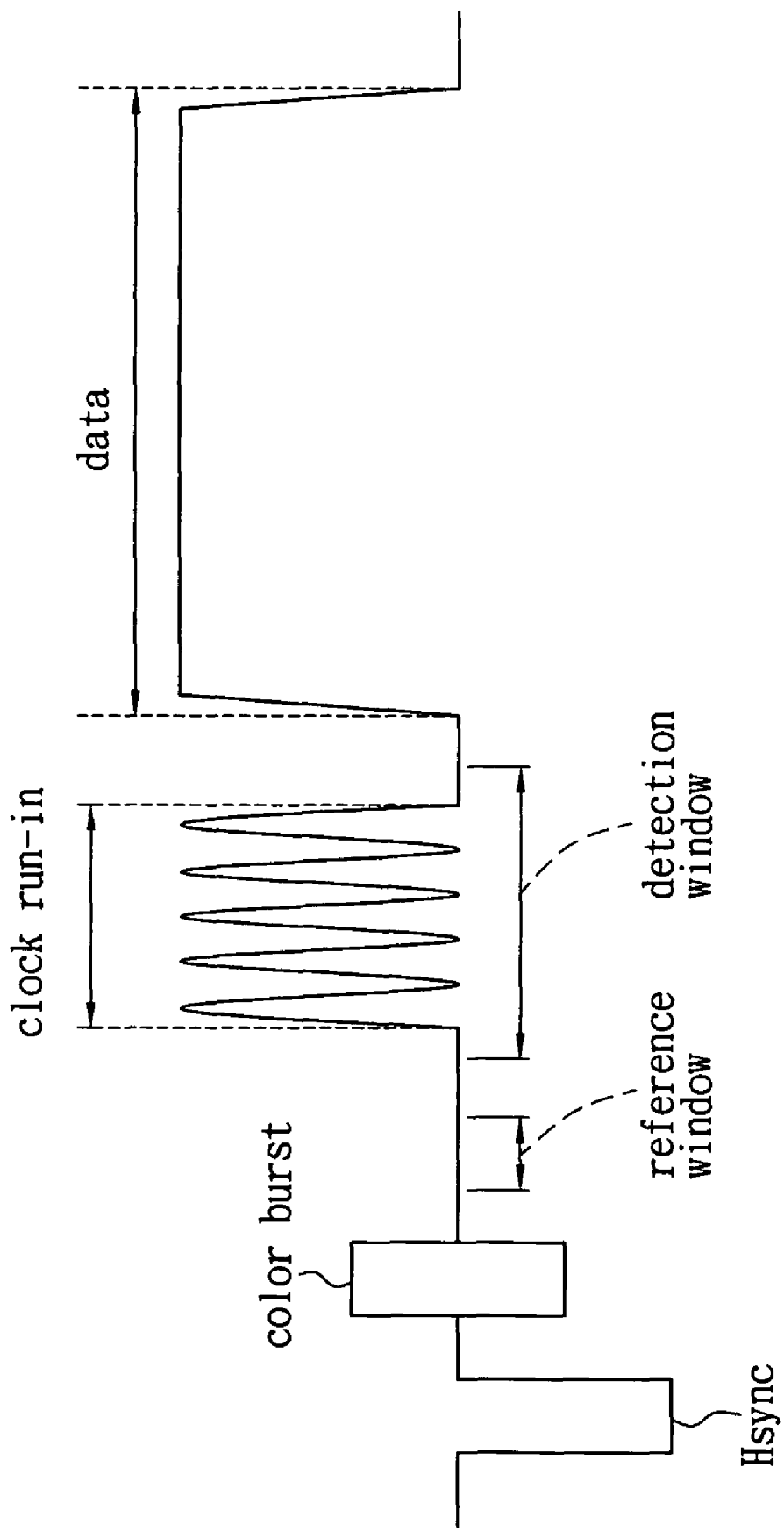
FIG. 3 shows a VBI signal, a detection window and a reference applied in the VBI signal.

FIG. 3 shows a VBI signal, a detection window and a reference window applied in the VBI signal. The reference window locates before the detection window, e.g. the range of $30^{th}$ to $50^{th}$ sample points. The reference level can be determined according to the sampled values in the reference window, for example, by averaging the sampled values in the reference window. The threshold to detect the presence of the clock run-in signal can be determined, for example, by adding a predetermined height to the reference level. Then, when a sample point in the detection window exceeds the threshold, it can be determined that the clock run-in signal is detected.

The window-adjusting unit 23 is coupled to the detection unit 22 and adjusts the range of the detection window according to the detection signal from the detection unit 22. For example, the window-adjusting unit 23 can obtain a detection rate of clock run-in signal through the detection signal. The detection signal, for example, indicates whether a clock run-in signal is detected for each field. Thus, the window-adjusting unit 23 can calculate how many times the clock run-in signal is detected during a predetermined number of fields, i.e. the detection rate of clock run-in signal, according to the detection signal. Next, the window-adjusting unit 23 dynamically adjusts the range of the detection window according to the detection rate. For example, when the detection rate is higher than a first predetermined value, it is determined that the received VBI signal is stable. Thus, the window-adjusting unit 23 can decrease the range of the detection window to reduce the possibility of false alarm. On the other hand, when the detection rate is lower than a second predetermined value, it is determined that the received VBI signal is unstable. Thus, the window-adjusting unit 23 increases the range of the detection window to assure the detection of the VBI signal. In other words, the window-adjusting unit 23 dynamically adjusts the detection window to a proper range according to signal stability. Besides, the first and second predetermined values are programmable for good flexibility.

For example, in FIG. 2, the detection signal indicates the position of each sample point where a clock run-in signal is detected. According to the position information, the window-adjusting unit 23 can decide a positioning point of the detection window. Then, a range of sample points centering around the positioning point is decided as the detection window. The window-adjusting unit 23 carries out an alpha blending operation for the position information to determine the positioning point. Let the current positioning point of the detection window be $P_{window}(n)$ and the current position of the clock run-in signal be $P_{detect}(n)$, then a new positioning point of the detection window is generated as:

$$P_{window}(n+1)=P_{window}(n)(1-\alpha)+P_{detect}(n)\times\alpha \quad \text{Eq. (1)}$$

where $\alpha$ ranges between 0 and 1 and is programmable.

Figure 4:
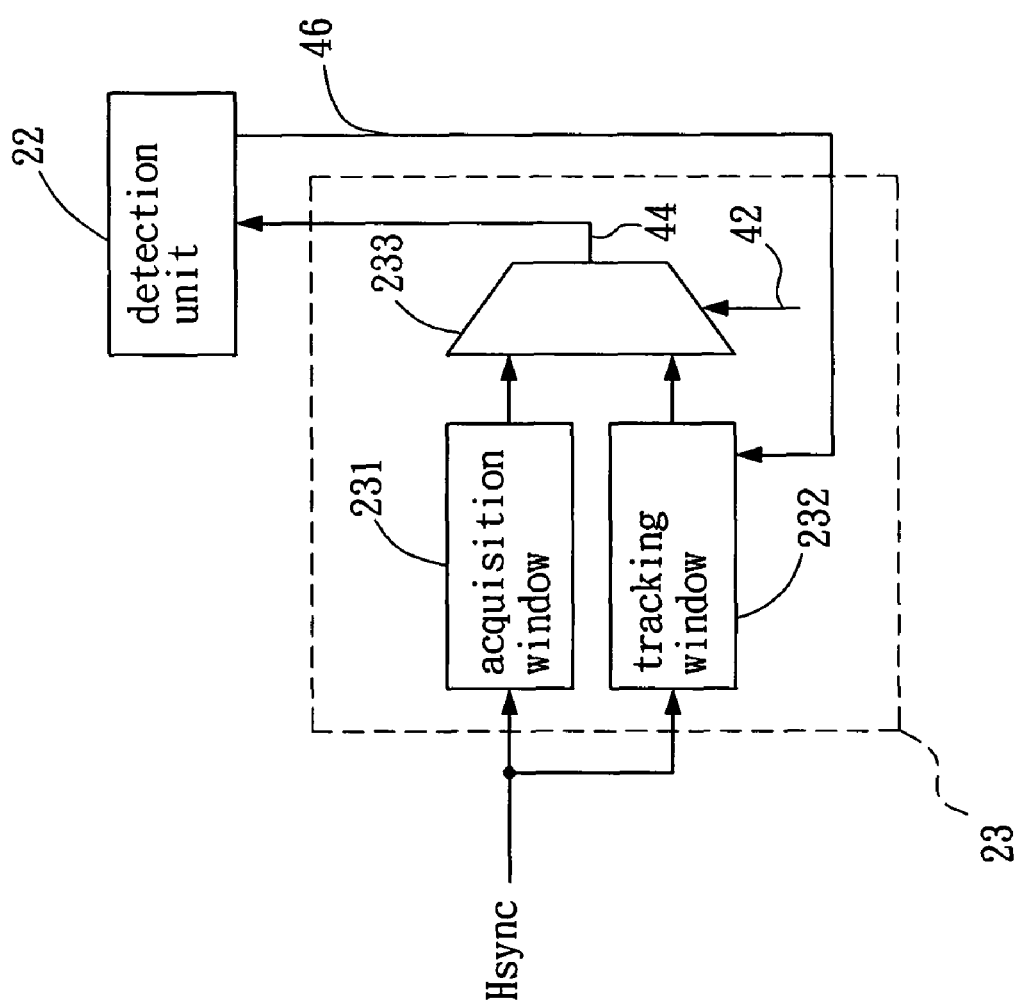
FIG. 4 is a block diagram of the window-adjusting unit in FIG. 2 according to an embodiment of the present invention.

FIG. 4 is a block diagram of the window-adjusting unit 23 in FIG. 2 according to an embodiment of the present invention. The window-adjusting unit 23 includes an acquisition window 231, a tracking window 232 and a multiplexer 233. The acquisition window 231 and tracking window 232 receive a horizontal synchronous (Hsync) signal and determine a range of the detection window. The multiplexer 233 selects either the acquisition window 231 or tracking window 232 as its output 44 according to a control signal 42 controlled by a state machine (not shown). Therefore, the output 44 determines the range for clock run-in detection for the detection unit 22. Preferably, the window-adjusting unit 23 initially operates in the acquisition mode, and enters the tracking mode after having detected the clock run-in signal. Preferably, the window-adjusting unit 23 applies a detection window with a fixed range in the acquisition mode, while applies a detection window with a dynamic range in the tracking mode.

For example, since the VBI signals provided by various TV system providers might position at any possible region, the detection unit 22 is not easy to ascertain the position of the clock run-in signal in the VBI signal initially. Preferably, the window-adjusting unit 23 initially operates in the acquisition mode to provide a detection window with a large and fixed range, so as to prevent the detection unit 22 from missing the clock run-in signal. The multiplexer 233 provides the range for clock run-in detection by selecting the acquisition window 231 via the control signal 42 output by the state machine (not shown). For example, the acquisition window 231 generates a mask signal to the detection unit 22 via the multiplexer 233, so as to indicate the range for clock run-in detection. When the detection rate of clock run-in signal is higher than a first predetermined value, the approximate position of the clock run-in signal of the current TV channel is determined according to the acquisition window 231. Then, the window-adjusting unit 23 enters the tracking mode to avoid the interference of noises and increase the accuracy of the clock run-in detection. In the tracking mode, the multiplexer 233 provides a detection window with a dynamic range by selecting the tracking window 232 via the control signal 42 controlled by the state machine (not shown). For example, the detection unit 22 detects the clock run-in according to the current detection window with a window range designated by the tracking window 232, and sends the current position $P_{detect}(n)$ of detected clock run-in signal via the detection signal 46 to the tracking window 232, so as to determine the next positioning point $P_{window}(n+1)$ by, for example, the alpha blending operation. Then, the tracking window 232 can provide a detection window, smaller than the acquisition window, with reference to the new positioning point $P_{window}(n+1)$. Alternatively, a dynamic detection window can be determined according to the detection rate of clock run-in signal with reference to the new positioning point $P_{window}(n+1)$, for example centering around $P_{window}(n+1)$. In other words, the range of detection window can be fine tuned according to the variation of the detection rate. Furthermore, when the detection rate is lower than the second predetermined value or when no clock run-in is detected due to, e.g. channel switching, the state machine (not shown) controls the multiplexer 233 to return to the acquisition mode via the control signal 42. The acquisition window 231 and tracking window 232 respectively provide a first range and a second range of the detection window. Preferably, the second range is dynamically adjusted according to the detection signal 46. When the multiplexer 233 selects the first range provided by the acquisition window 231, the detection unit 22 performs detection with a larger window in the acquisition mode. When the multiplexer 233 selects the second range provided by the tracking window 232, the detection unit 22 performs detection with a dynamic detection window in the tracking mode. Thus, the detection unit 22 alternatively operates in the acquisition mode and tracking mode according to the signal stability.

Figure 5:
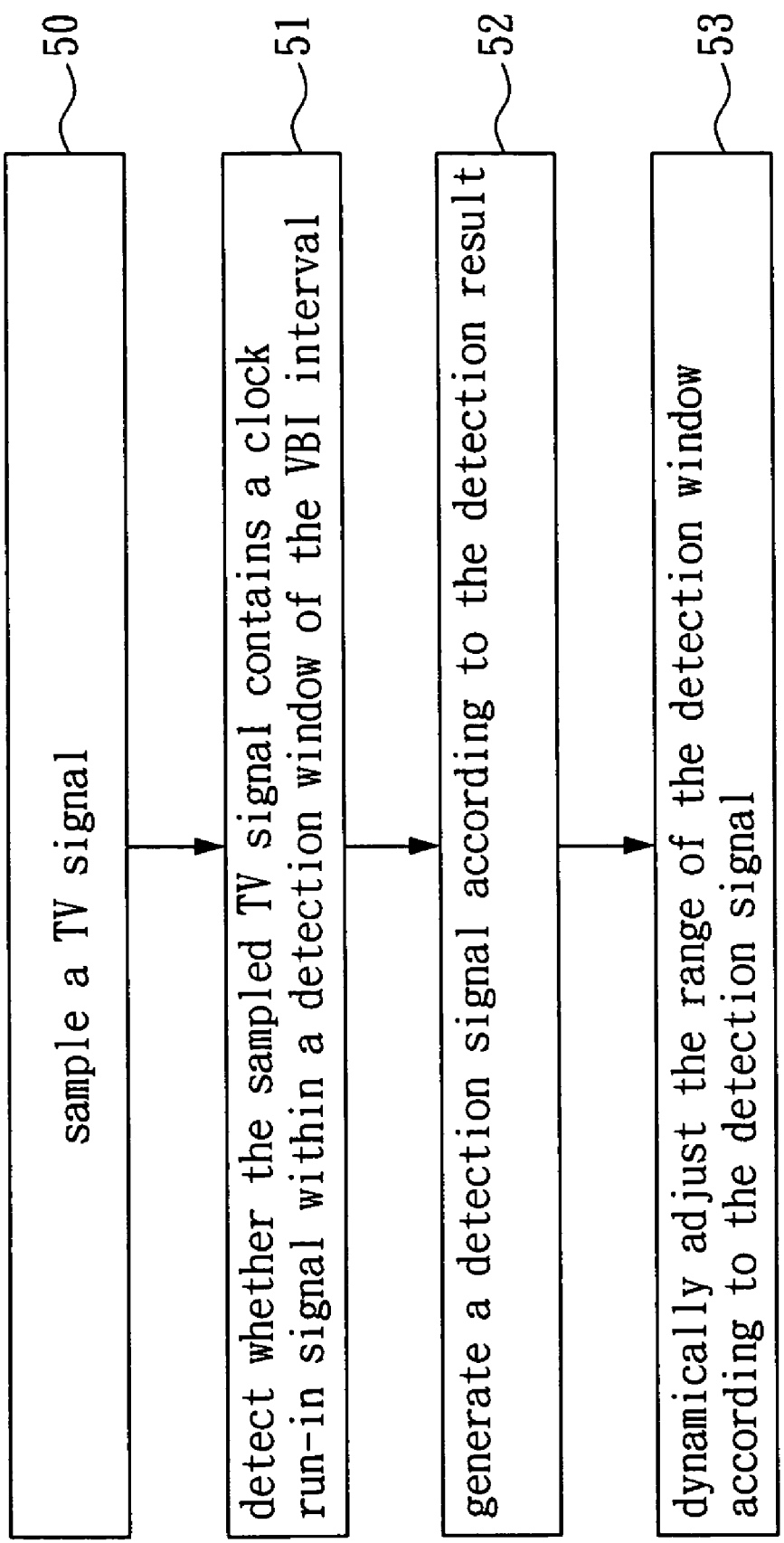
FIG. 5 is a flow chart of a method for detecting VBI signals according to a preferred embodiment of the invention.

FIG. 5 is a flow chart of a method for detecting VBI signals according to a preferred embodiment of the invention. The method comprises the following steps:

Step 50: sampling a TV signal;

Step 51: detecting whether the sampled TV signal contains a clock run-in signal within a detection window of the VBI interval;

Step 52: generating a detection signal according to the detection result; and

Step 53: dynamically adjusting the range of the detection window according to the detection signal.

In step 50, an analog-to-digital converter samples the TV signal. In step 51, the sampled values of a plurality of sample points of the TV signal within the detection window are compared to a threshold, so as to determine the point(s) where the clock run-in signal is detected. The threshold is determined according to a reference level. The manner for determining the threshold and the reference level is described in the preferred embodiment of FIG. 2 and is omitted here.

In step 53, a detection rate of clock run-in signal can be calculated according to the detection signal, as described above. When the detection rate is higher than a first predetermined value, the range of the detection window is narrowed; when the detection rate is lower than the above second predetermined value, the range of the detection window is enlarged. In this embodiment, the detection window has a first range and a second range, where the second range is smaller than the first range. When the detection rate is higher than the first predetermined value, the detection window is adjusted to the second range; when the detection rate is lower than the second predetermined value, the detection window is adjusted to the first range.

Preferably, the detection signal dynamically indicates a positioning point of the clock run-in signal by providing the position information (e.g. $i^{th}$ point) of the sample point where the clock run-in signal is detected. For instance, the positioning point can be a center point of the detection window determined according to an alpha blending operation of the detected position information. The manner for determining the positioning point is detailed in the preferred embodiment of FIG. 2 and is omitted here.

While the present invention has been shown and described with reference to the preferred embodiments thereof and in terms of the illustrative drawings, it should not be considered as limited thereby. Various possible modifications and alterations could be conceived of by persons skilled without departing from the scope and the spirit of the present invention.

What is claimed is:

1. An apparatus for detecting a vertical blanking interval (VBI) signal comprising:
 a detection unit for detecting whether a TV signal contains a clock run-in signal within a detection window and generating a detection signal; and
 a window-adjusting unit, coupled to the detection unit, for dynamically adjusting a range of the detection window according to the detection signal; wherein the window-adjusting unit comprises:
  an acquisition window for indicating a first range of the detection window;
  a tracking window for indicating a second range of the detection window; and
  a multiplexer for selecting one of the first range and the second range and outputting the selected range to the detection unit; wherein the second range is substantially smaller than the first range.

2. The apparatus of claim 1, wherein the detection unit determines whether the clock run-in signal is detected according to a level value of the TV signal within the detection window.

3. The apparatus of claim 2, further comprising:
 a signal conversion unit for sampling the TV signal to generate a plurality of sampled values to the detection unit;
 wherein the detection unit compares the sampled values in the detection window with a threshold to determine whether the clock run-in signal is detected.

4. The apparatus of claim 3, wherein the threshold is determined according to a reference level and the reference level is determined according to a plurality of level values of the TV signal in a reference window.

5. The apparatus of claim 3, wherein the detection signal indicates a current position information of the clock run-in signal, and the window-adjusting unit dynamically determines a positioning point of the detection window according to the current position information.

6. The apparatus of claim 5, wherein the positioning point represents a center point of the detection window.

7. The apparatus of claim 5, wherein the window-adjusting unit performs an alpha blending operation on the current position information to determine the positioning point.

8. The apparatus of claim 1, wherein the window-adjusting unit dynamically adjusts the range of the detection window according to a detection rate of the clock run-in signal.

9. The apparatus of claim 1, wherein the tracking window dynamically adjusts the second range according to the detection signal.

10. The apparatus of claim 1, wherein the multiplexer selects one of the first range and the second range according to a detection rate of the clock run-in signal, and outputs the selected range to the detection unit.

11. The apparatus of claim 10, wherein the multiplexer selects the second range when the detection rate of the clock run-in signal is higher than a first predetermined value.

12. The apparatus of claim 10, wherein the multiplexer selects the first range when the detection rate of the clock run-in signal is lower than a second predetermined value.

13. The apparatus of claim 1, wherein the VBI signal conforms to one of the following specifications: Closed Caption (CC), Copy Generation Management System (CGMS), Wildscreen Signaling (WSS), Video Programming System (VPS), and Teletext.

* * * * *